United States Patent [19]

Zerilli

[11] Patent Number: 4,793,648
[45] Date of Patent: Dec. 27, 1988

[54] REMOVABLE CLOSURE FOR DASH BOARD UTILITY SHELF

[76] Inventor: Louis Zerilli, 25120 Culver, St. Clair Shores, Mich. 48081

[21] Appl. No.: 163,005

[22] Filed: Mar. 2, 1988

[51] Int. Cl.⁴ .............................................. B60R 7/06
[52] U.S. Cl. ............................... 296/37.12; 224/42.42
[58] Field of Search ............... 296/37.12; 224/42.42 R

[56] References Cited

U.S. PATENT DOCUMENTS 2,834,566  5/1958  Bower ................................. 296/37.8
4,099,814  7/1978  Hasselberger .................... 296/37.12

FOREIGN PATENT DOCUMENTS 3510405  9/1986  Fed. Rep. of Germany .
188932  11/1922  United Kingdom .

Primary Examiner—Robert R. Song
Attorney, Agent, or Firm—Cullen, Sloman, Cantor, Grauer, Scott & Rutherford

[57] ABSTRACT

A removable closure sheet for a recessed utility shelf within a vehicle dash board is rectangular in shape and oversize in height relative to the shelf and includes spaced thumb and finger openings to facilitate manipulation of the sheet to a transversely arcuate shape for assembly into and removal from the shelf.

6 Claims, 1 Drawing Sheet

REMOVABLE CLOSURE FOR DASH BOARD UTILITY SHELF

FIELD OF INVENTION

The present invention is directed to a closure for the normally open utility shelf arranged upon the dash board of some vehicles, and more particularly to a flexible closure of resilient material which may be manipulated into an arcuate shape for positioning into and removal from the utility shelf.

BACKGROUND OF THE INVENTION

Previously in some vehicle constructions including trucks there have been provided in addition to the conventional glove compartment with a hinged door, a recessed utility shelf which opens through the dash board. The difficulty with the utility shelf has been the lack of a closure permits articles stored within the utility shelf to fall out on sudden starting or stopping, or change of direction.

SUMMARY OF THE INVENTION

An important feature of the present invention is to provide for a vehicle dash board utility shelf a removable closure which includes a normally flat sheet of flexible material, such as plastic material, of general rectangular shape which is oversize in height relative to the closure and which may be manually flexed into a transversely arcuate shape to fit and be frictionaly retained within the utility shelf.

Another feature is to provide a normally flat flexible closure sheet of general rectangular shape, along its bottom ledge anchored and retained within and upon the shelf along its length against the interior of the dash board with the body of the sheet curved rearwardly under tension and with its top edge frictionally engaging the top of the shelf rearwardly of the shelf opening.

As another feature the closure sheet along its bottom edge bears against the bottom wall and along its top edge bears against the top wall and with the edge edges thereof adjacent to but spaced from the end walls of the utility shelf to facility insertion and removal therefrom.

Still another feature is to provide a pair of centrally arranged spaced thumb and finger openings in the sheet to facilitate manipulation of the sheet to a transversely arcuate shape for assembling into the shelf and for easy removal of the closure sheet therefrom.

These and other feature and objects will be seen from the following specification and claims in conjunction with the appended drawing.

THE DRAWINGS

DETAILED DESCRIPTION OF AN EMBODIMENT OF THE INVENTION

Figure 1:
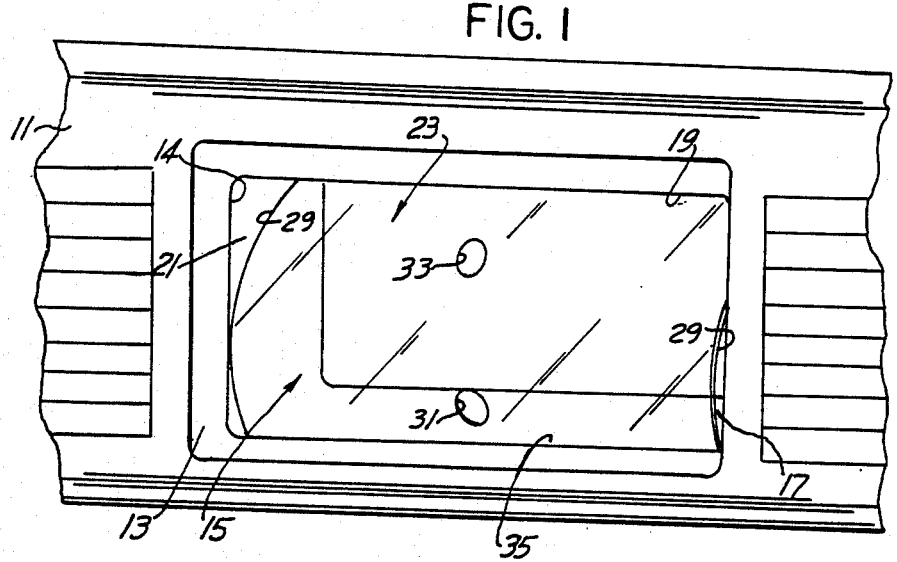
FIG. 1 is a front perspective view of a utility shelf within a vehicle dash board, fragmentarily shown, and with the present flexible closure assembled therein.

It will be understood that the drawing illustrates a preferred embodiment of the invention and that other embodiments are contemplated within the scope of the claims here after set forth.

Referring to the drawing a vehicle dash board is fragmentarily shown at 11 including a molded peripheral panel frame 13 defining a rectangular opening for utility shelf 15. Said utility shelf is mounted upon and extends rearwardly of dash board 11 and includes bottom wall 17, top wall 19 spaced therefrom and a pair of generally upright end walls 21.

There is provided for the utility shelf 15 mounted upon the dash board 11 opening through the dash board a rectangular opening 14 therein. The closure for the utility shelf is shown on an increased scale in FIGS. 2 and 3. The removable closure is in the form of flat sheet 23 of flexible plastic material having a bottom edge 25, a top edge 27 and end edges 29.

The present closure sheet 23 is normally flat and is constructed of a suitable plastic material, such as polystyrene for illustration though not limited thereto. In the illustrative embodiment sheet 23 is transparent, but could be opaque. A pair of spaced thumb and finger openings 31, 33 are formed through the closure sheet 23 intermediate ends and spaced inwardly from the top and bottom edges thereof in order to facilitate manipulation of the closure sheet. The closure sheet 23 is normally of a vertical height greater than the vertical height between the top and bottom walls 19 and 17 of the utility shelf. Sheet 23 is of a length less than the distance between shelf end walls 21 in order to facilitate assembly of the closure sheet into the utility shelf 15 and removal therefrom.

The vertical height of the flexible plastic sheet 23 is greater than the vertical height between the top and bottom walls of the utility shelf. In order to utilize the normally flat flexible closure sheet 23, with the thumb and middle finger inserted respectively within openings 31 and 33, the closure is flexed into a transversely arcuate shape, in FIG. 1. This facilitates insertion of the closure sheet into and through opening 14 into the open end of utility shelf 15. The bottom edge 25 of the closure sheet bears against an interior portion of the dash board 11 adjacent panel frame 13. The top edge 27 of the closure sheet extends rearwardly from opening 14 in the dash and frictionally and retainingly engages top wall 19 of the utility shelf for self securing in the use position shown.

The present removable and flexible closure for the utility shelf provides a means by which articles once inserted within the utility shelf will not accidentally fall therefrom or become dislodged on sudden changes in direction or during stops and starts of the vehicle.

While the vertical height of the flexible closure sheet 23 is greater than the height between the top and bottom wall of the utility shelf, the length of the closure sheet is actually less than the distance between end walls 21. Thus, upon insertion of the closure sheet when in the manually positioned arcuate form shown the respective opposite ends 29 of the closure sheet easily clear the peripheral panel frame 13 and are spaced adjacent corresponding end walls 21 of the utility shelf.

By initially flexing the closure sheet manually using the thumb and middle finger such as to the transversely arcuate form shown in FIG. 1, the closure sheet may be manually inserted through the peripheral panel frame 13 of dash board 11 and into the front opening of the utility shelf.

Upon assembly the bottom edge 25 of closure 23 retainingly engages an interior portion 35 of the vehicle dash board adjacent the peripheral panel frame 13 serving as a stop therefore. The top edge 27 of the closure sheet extends over and engages a portion of the top wall of the shelf rearwardly of rectangular opening 14.

Figure 3:
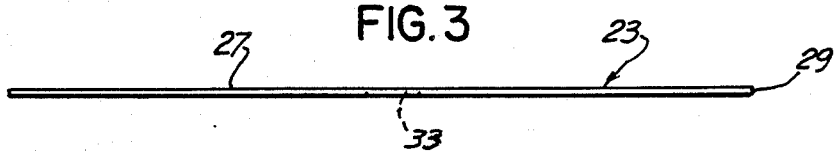
FIG. 3 is a plan view thereof.
Figure 2:
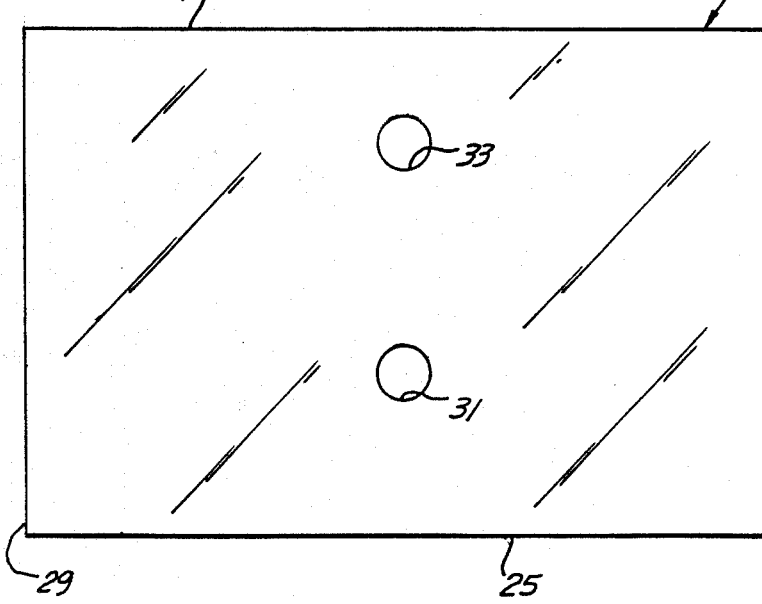
FIG. 2 is a front view of the normally flat removable closure shown on an increased scale.
Figure 4:
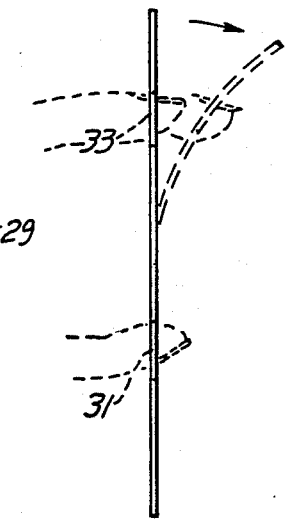
FIG. 4 is a side elevational view thereof.

The plastic sheet 23 is normally flat, FIGS. 2 and 3, and when formed by the fingers to the arcuate shape is stressed into such transversely arcuate shape. This aids insertion into the utility shelf where the respective edges operatively engage interior portions of the utility shelf so that the closure is self retaining and securing therein. The vertical height of the peripheral panel frame 13 is reduced with respect to the distance between the top and bottom walls of the utility shelf thereby defining a stop ledge at the front of the shelf and at the rear of the dash board 11 adapted to anchor the bottom edge 25 of the strip when inserted within and upon the utility shelf.

Having described my invention reference should now be had to the following claims.

I claim:

1. In combination with a vehicle dash board having a recessed utility shelf opening through the dash board, and a removable closure including a normally flat sheet of flexible plastic material of rectangular shape, along its bottom edge anchored and retained within and upon the shelf along its length against the interior of the dash board, with the body of the sheet curved rearwardly under tension and with its top edge frictionally and retainingly engaging the top of the shelf rearwardly of its opening.

2. In the utility shelf of claim 1,
said shelf having top, bottom and end walls, said sheet along its bottom edge bearing against said bottom wall, along its top edge bearing against said top wall and with its end edges arranged adjacent said end walls.

3. In the utility shelf of claim 1,
there being a pair of spaced thumb and finger openings in said sheet intermediate its ends and spaced inwardly of its top and bottom edges to facilitate manipulation of said sheet to a transversely arcuate shape for assembling into said shelf and for removal of the sheet therefrom.

4. In the utility shelf of claim 1,
the dash board including a peripheral panel frame of reduced height relative to said shelf defining a stop ledge at the front of the shelf adapted to anchor the bottom edge of said sheet.

5. In the utility shelf of claim 1,
said closure sheet being transparent.

6. In the utility shelf of claim 2,
the closure sheet having a height greater than the spacing between the shelf top and bottom walls.

* * * * *